(12) United States Patent
Wolf et al.

(10) Patent No.: US 8,745,335 B2
(45) Date of Patent: Jun. 3, 2014

(54) MEMORY ARBITER WITH LATENCY GUARANTEES FOR MULTIPLE PORTS

(75) Inventors: Pieter Van Der Wolf, Leende (NL); Marc Jeroen Geuzebroek, Budel (NL); Johannes Boonstra, Deume (NL)

(73) Assignee: Synopsys, Inc., Mountain View, CA (US)

( * ) Notice: Subject to any disclaimer, the term of this patent is extended or adjusted under 35 U.S.C. 154(b) by 548 days.

(21) Appl. No.: 13/171,484

(22) Filed: Jun. 29, 2011

(65) Prior Publication Data

US 2013/0007386 A1    Jan. 3, 2013

(51) Int. Cl.
*G06F 12/00* (2006.01)
*G06F 13/16* (2006.01)
*G06F 13/18* (2006.01)

(52) U.S. Cl.
CPC .......... *G06F 13/1605* (2013.01); *G06F 13/161* (2013.01); *G06F 13/18* (2013.01)
USPC .......... 711/151; 711/149; 711/150; 710/240; 710/309

(58) Field of Classification Search
CPC ... G06F 13/16; G06F 13/1605; G06F 13/161; G06F 13/18; G06F 13/4031; G06F 13/364; G06F 13/374
See application file for complete search history.

(56) References Cited

U.S. PATENT DOCUMENTS

| 6,892,289 | B2 * | 5/2005 | Moss ............................ 711/167 |
| 2003/0028694 | A1 * | 2/2003 | Aboulenein et al. .......... 710/107 |

* cited by examiner

*Primary Examiner* — Reginald Bragdon
*Assistant Examiner* — Thanh D Vo
(74) *Attorney, Agent, or Firm* — Baker Botts L.L.P.

(57) ABSTRACT

Memory arbiter with latency guarantees for multiple ports. A method of controlling access to an electronic memory includes measuring a latency value indicative of a time difference between origination of an access request from a port of a plurality of ports and a response from the electronic memory. The method also includes calculating a difference between the latency value for the port and a target value associated with the port. The method further includes calculating a running sum of differences for the port covering each of a plurality of access requests. Further, the method includes determining a delta of a priority value for the port based on the running sum of differences. Moreover, the method includes prioritizing the access by the plurality of ports according to associated priority values.

31 Claims, 4 Drawing Sheets

MEMORY ARBITER WITH LATENCY GUARANTEES FOR MULTIPLE PORTS

TECHNICAL FIELD

Embodiments of the disclosure relate generally to controlling access to an electronic memory, and particularly to a memory arbiter with latency guarantees for multiple ports.

BACKGROUND

Typically, a system-on-chip (SoC) performs several functions simultaneously, for example a video processing function, an audio processing function, a web-browsing function, and a user interface function. Processes associated with each of such functions have different real-time constraints. For example, it is critical for a video frame or an audio sample to be processed on or before a certain deadline, else it may result in image artifacts, jitter, frozen video and generally poor user experience. In another example, web-browsing has higher flexibility as an occasional delay in processing a web request, even if slightly beyond a nominal deadline, is acceptable.

Examples of SoCs are found in various consumer electronic appliances including, but not limited to, mobile phones, smart phones, digital high-definition televisions, set-top boxes, personal digital assistants, and tablet computers. Among other factors, for example processor speed, a speed at which the SoC performs is determined to a large extent based on latency of memory access. The latency of memory access can be defined as length of time between arrival of an access request made to memory and return of associated response from the memory. Overall performance of the SoC is hence dependent on the latency of memory access, with lower latency of memory access resulting in higher SoC performance.

There are multiple clients that access the memory in order to execute different processes associated with the functions of the SoC. Each client makes multiple requests to the memory. Time needed for a client to execute a process depends on the latency for accessing the memory. Some clients have a deadline for executing a process that must be met in order to satisfy real-time constraints. In order to achieve the deadline, average latency for accessing the memory needs to be bounded for a set of consecutive memory accesses. However, other clients do not have such deadlines. In order to serve each client that needs to access the memory, a suitable memory needs to be designed. However, designing such memory is difficult as one or more of the clients have higher deadline sensitivity than others.

Hence, there is a need for providing memory access to multiple clients of differing real-time constraints such that each deadline is met.

SUMMARY

An example of a memory controller includes a plurality of ports in communication with an electronic memory. The memory controller also includes a memory arbiter in communication with the electronic memory and operative to determine priorities among a plurality of access requests from the plurality of ports. The memory controller further includes a plurality of latency determiners in communication with the plurality of ports. A latency determiner of the plurality of latency determiners is in communication with a port of the plurality of ports and operative to determine a latency value indicative of a time difference between origination of an access request from the port and a response from the electronic memory. The latency value corresponds to the access request. Further, the memory controller includes a plurality of target registers associated with the plurality of ports. A target register of the plurality of target registers associated with the port stores a target value for the port. The target value is indicative of a desired average latency for the plurality of access requests from the port. Moreover, the memory controller includes a plurality of accounting units associated with the plurality of ports. An accounting unit of the plurality of accounting units associated with the port maintains a running sum of differences between a plurality of latency values of the access requests and the target latency value for one or more of the plurality of access requests from the port to provide the memory arbiter a delta of a priority value.

An example of a method of controlling access to an electronic memory includes measuring a latency value indicative of a time difference between origination of an access request from a port of a plurality of ports and a response from the electronic memory. The method also includes calculating a difference between the latency value for the port and a target value associated with the port. The method further includes calculating a running sum of differences for the port covering each of a plurality of access requests. Further, the method includes determining a delta of a priority value for the port based on the running sum of differences. Moreover, the method includes prioritizing the access by the plurality of ports according to associated priority values.

An example of a computer program product stored on a non-transitory computer-readable medium that when executed by a processor, performs a method of controlling access to an electronic memory includes measuring a latency value indicative of a time difference between origination of an access request from a port of a plurality of ports and a response from the electronic memory. The computer program product also includes calculating a difference between the latency value for the port and a target value associated with the port. The computer program product further includes calculating a running sum of differences for the port covering each of a plurality of access requests. Further, the computer program product includes determining a delta of a priority value for the port based on the running sum of differences. Moreover, the computer program product includes prioritizing the access by the plurality of ports according to associated priority values.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

DETAILED DESCRIPTION OF THE EMBODIMENTS

Figure 1:
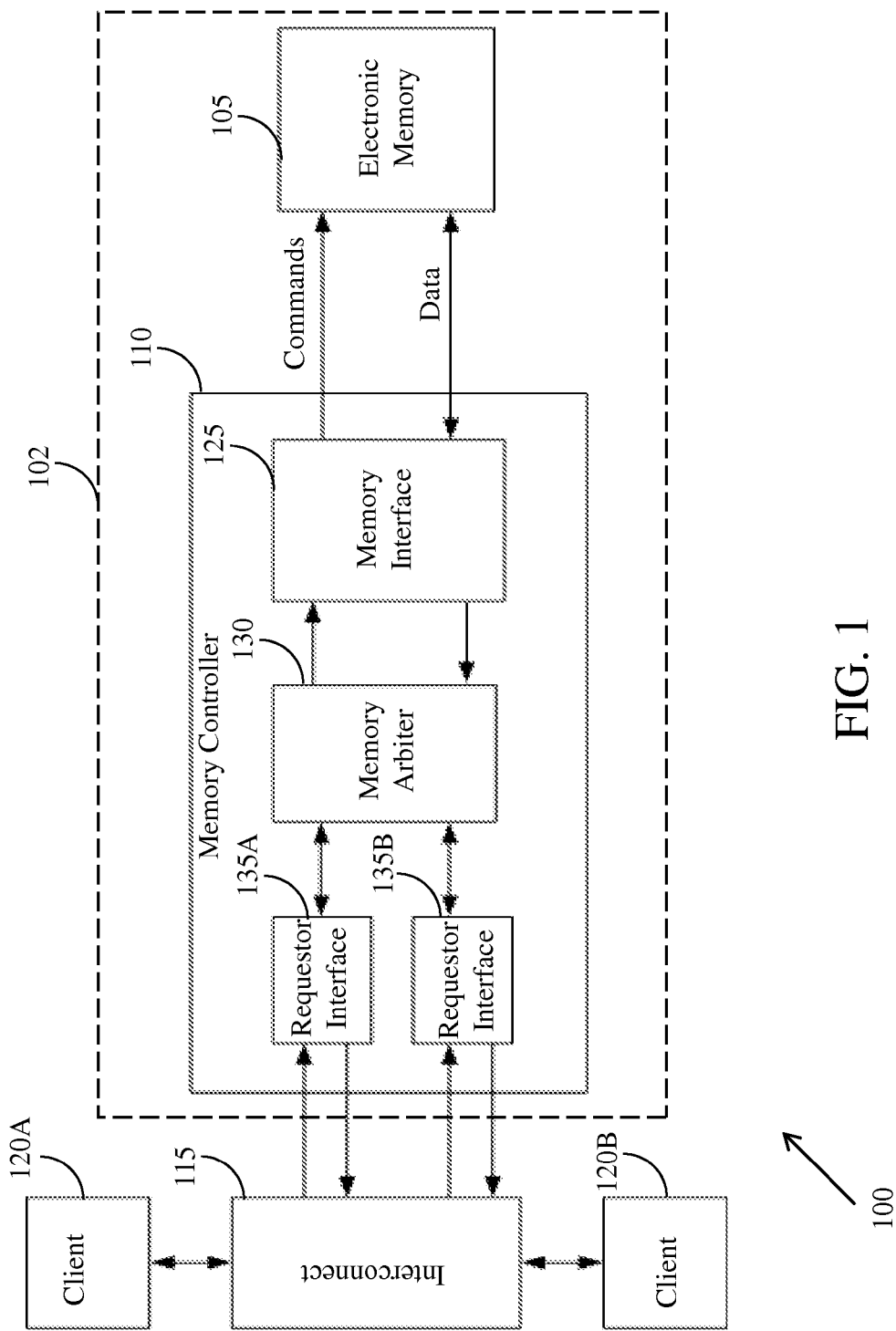
FIG. 1 is a block diagram of an environment, in accordance with which various embodiments can be implemented.

Embodiments of the present disclosure provide a method of controlling access to an electronic memory to provide latency guarantees on selected ports integrated in a system-on-chip (SoC).

In one embodiment, a client is an entity that sends access requests to the electronic memory. Examples of the client include, but are not limited to, an electronic device, a software application, a software process, an interrupt, and a signal. Other examples of the client include, but are not limited to, a central processing unit, a digital signal processor, or a function-specific processing unit. Clients perform functions, for example audio processing, video processing, and web browsing, which can be implemented in hardware, software, or combinations thereof.

The qualifier hard, when used to describe a deadline, implies that the deadline must be met each time. An example of a client that imposes the hard deadline is an audio processing application. The opposite of the hard deadline is a soft deadline that permits occasional violation. The qualifiers short or tight, when used to describe a deadline, imply that the deadline allows only a short time frame to perform a task or action. Permissible latency or delay in responding to an access request with a tight deadline is short. The opposite of a tight deadline is a long deadline.

It can be possible that a hard deadline is not tight, that is, it is critical that the deadline be met, although the latency requirement is not short. In other words, for the hard deadline that is not tight, the response need not be early but it should necessarily be on time. It is similarly possible that a client requires a soft deadline that is also tight, that is, the response to an access request can occasionally be delayed but it should mostly be on time. For a client with a tight deadline, an occasional missing of deadline, although permissible, must be followed by several consecutive accesses that do meet the deadline. Examples of the clients that allow soft deadlines and tight deadlines are web-browsing applications and user-interface applications. Such user-interface applications typically have no explicit deadlines and are referred to as best-effort applications.

Tasks that impose the hard deadlines require response on a real-time basis, that is, generally at a high priority, while tasks that have the soft deadlines or no deadlines require response on a best-effort basis, that is, at highest priority allowable after competing real-time tasks are served.

The terms memory port, port of a memory, or port can be defined as a facility or interface offered by a memory system where a client submits the access request and expects a response from the memory system. Generally, a particular client sends access requests to and receives responses from a pre-determined or programmable set of ports. Association between the client and the port is generally constant over extended periods of time.

In one embodiment, an arbiter is a device that determines and grants access of a common resource such as memory to multiple competing clients. The present disclosure includes a memory arbiter that assures that clients on selected ports which send access requests get on average a response within a specified time. The present disclosure assures guaranteed average latency by monitoring latency on the ports in real-time and assigning higher priority to the clients whose access requests have recently not met target average latency. That is, priority is removed from performing clients and providing that priority to the clients that have been lagging in performance. In this way, the present disclosure is able to cope with multiple clients that have differing deadline sensitivities. For example, in an SoC that simultaneously needs to process audio (hard deadline) and web-browsing (tight but soft deadline), one embodiment allows both audio client and web-browsing client to meet respective latency requirements by adaptively assigning high priority to the audio client, possibly at expense of the web-browsing client, even though the web-browsing client has access to the electronic memory on a best-effort basis.

FIG. 1 is a block diagram of an environment 100, in accordance with one embodiment. The environment 100 includes a memory system 102. The memory system 102 includes an electronic memory 105 and a memory controller 110. The environment 100 also includes an interconnect 115 and a plurality of clients, for example a client 120A and a client 120B, coupled to the memory system 102. The memory controller 110 further includes a memory interface 125, a memory arbiter 130, and a plurality of requestor interfaces, for example a requestor interface 135A and a requestor interface 135B.

The memory controller 110 is coupled between the electronic memory 105 and the interconnect 115. The client 120A and the client 120B are coupled to the memory controller 110 via the interconnect 115. The memory interface 125 is coupled to the electronic memory 105 and to the memory arbiter 130. The requestor interface 135A and the requestor interface 135B are coupled between the memory arbiter 130 and the interconnect 115.

The electronic memory 105, for example random access memory and read only memory, can be shared by the clients to reduce cost of the SoC. The memory controller 110 enables sharing and controlling of the electronic memory 105, and hence manages flow of data between the memory 105 and the clients, for example the client 120A, and the client 120B. The memory controller 110 performs request scheduling, memory mapping, command generation and memory management.

Communication from the interconnect 115, via the memory controller 130, to the electronic memory 105 is performed by access requests and responses. Examples of the interconnect 115 include, but are not limited to, direct connections, a bus, and a network. A front-end and back-end can be identified within the memory controller 110. The front-end of the memory controller 110 performs memory independent tasks and the back-end of the memory controller 110 is responsible for memory dependent tasks. The memory arbiter 130 can be part of the front-end, the back-end, or both.

The access requests of a client arrive at a corresponding requestor interface and are decoded. For example, the access requests from the client 120A arrive at the requestor interface 135A, and the access requests from the client 120B arrive at the requestor interface 135B. The clients can use different interfaces and protocols. An access request includes commands and a type of access, for example a read access request and a write access request. The access request also includes an address of memory cells to access and write data for a write request. A requestor interface ensures that the access requests of the clients are translated to a usable format for the memory arbiter 130. The responses received from the memory arbiter 130 are transmitted by the interconnect 115 to the client. A response represents result of the access request, including read data for a read request.

The access requests coming from the requestor interfaces are used by the memory arbiter 130 for the request scheduling. The memory arbiter 130 selects the access request and sends the access request to the memory interface 125. The responses returned by the memory interface 125 are converted to a suitable format and routed back to a corresponding requestor interface.

Communication to the electronic memory 105 is performed by transmitting appropriate commands, transmitting write data, and receiving read data via the memory interface 125. The memory interface 125 is an interface between the electronic memory 105 and the memory controller 110. The memory interface 125 accepts the access requests from the memory arbiter 130. The read data, and parts of the access request, are packed into a response and transmitted back to the memory arbiter 130. The memory mapping and the command generation are implemented by the memory interface 125 when not performed by the memory arbiter 130. The memory management is also a responsibility of the memory interface 125.

The memory arbiter 130 is used to control and determine order of access to the electronic memory 105 by the clients. Examples of the clients can include, but are not limited to, an audio processing application and a video processing application that have hard deadlines regarding latency, and a web-browsing application and a user interface application that require on average short latencies. The memory arbiter 130 and elements of the memory controller 110 is explained in detail in conjunction with FIG. 2A and FIG. 2B.

Figure 2A:
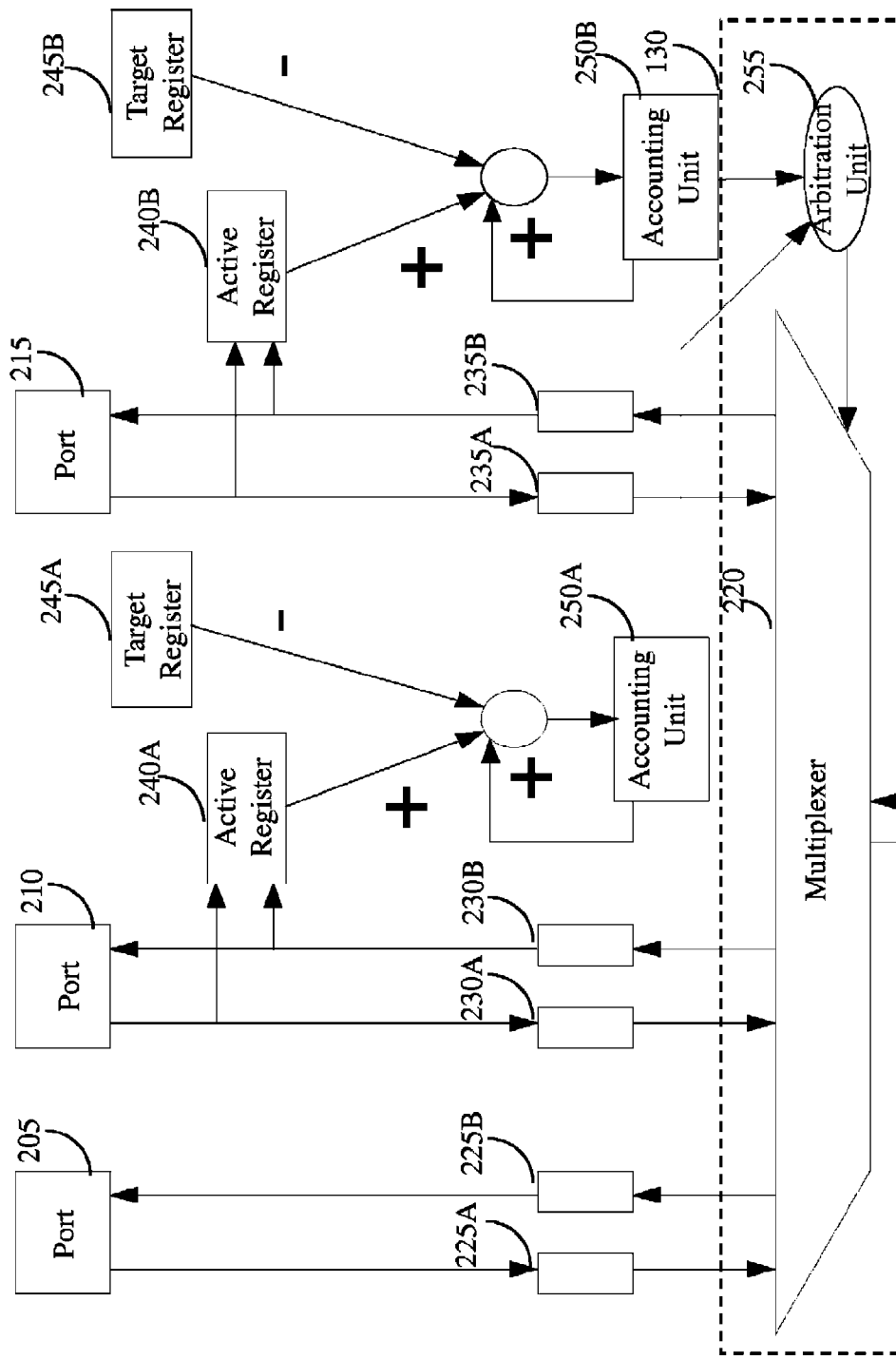
FIG. 2A is a schematic diagram illustrating latency guarantees on selected ports using a memory arbiter, in accordance with one embodiment.
Figure 2B:
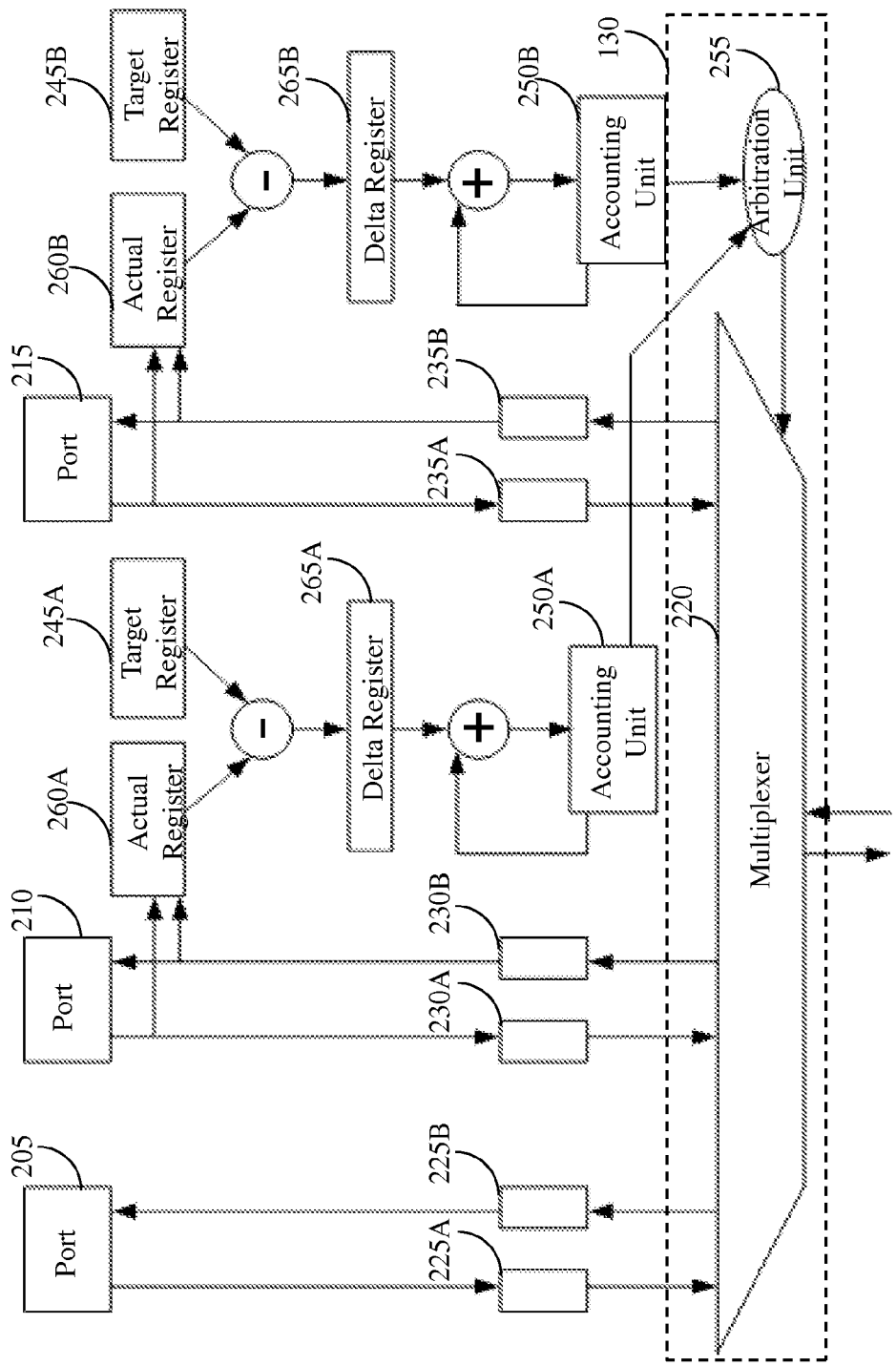
FIG. 2B is a schematic diagram illustrating latency guarantees on selected ports using a memory arbiter, in accordance with another embodiment.

FIG. 2A is a schematic diagram illustrating latency guarantees on selected ports using a memory arbiter, for example the memory arbiter 130, in accordance with one embodiment. FIG. 2B is another schematic diagram illustrating the latency guarantees on the selected ports using the memory arbiter 130, in accordance with another embodiment. The memory arbiter 130 includes a multiplexer 220 and an arbitration unit 255. The arbitration unit 255 is further coupled to the multiplexer 220. The memory arbiter 130 serves memory access, via the arbitration unit 255, to a plurality of clients, for example the client 120A and the client 120B, through a plurality of ports, for example a port 205, a port 210, and a port 215. Examples of the clients can include, but are not limited to, a video processing application, an audio processing application, a web-browsing application, and a user interface application.

The ports are coupled to the multiplexer 220 via a plurality of buffers, for example a buffer 225A, a buffer 225B, a buffer 230A, a buffer 230B, a buffer 235A, and a buffer 235B. The port 205 is coupled to the multiplexer 220 via the buffer 225A and the buffer 225B. The port 210 is coupled to the multiplexer 220 via the buffer 230A and the buffer 230B. The port 215 is coupled to the multiplexer 220 via the buffer 235A and the buffer 235B.

The arbitration unit 255 assures that the clients on selected ports requesting memory access receive a response within a specified time frame. The selected ports on which the latency guarantees are to be implemented are lesser than total number of the ports. For example, latency guarantee is implemented on the port 210 and the port 215.

In some embodiments, as illustrated in FIG. 2A, each of the selected ports is associated with an active register, a target register, and an accounting unit. In some embodiments, the target register is one of a plurality of target registers performing identical functions. In some embodiments, the accounting unit is one of a plurality of accounting units performing identical functions. The accounting unit can include an arithmetic and logic unit. The port 210 is associated with an active register 240A, a target register 245A, and an accounting unit 250A. Similarly, the port 215 is associated with an active register 240B, a target register 245B, and an accounting unit 250B. The active register 240A is coupled to the port 210 and the active register 240B is coupled to the port 215. The accounting unit 250A and the accounting unit 250B are coupled to the arbitration unit 255 of the memory arbiter 130.

In other embodiments, as illustrated in FIG. 2B, an actual register 260A and an actual register 260B are used in place of the active register 240A and the active register 240B respectively. A delta register 265A and a delta register 265B are also included. The port 210 is associated with the actual register 260A, the target register 245A, the delta register 265A, and the accounting unit 250A. Similarly, the port 215 is associated with the actual register 260B, the target register 245B, the delta register 265B, and the accounting unit 250B.

Latency determiners (not shown) can be further coupled to the ports and perform identical functions. For example, a first latency determiner can be coupled to the port 210 and a second latency determiner can be coupled to the port 215. In one example, the latency determiners can be counters that are set to value zero at time of origination of the access request and are read at time of response. In some embodiments, the active register 240A is included in the first latency determiner and the active register 240B is included in the second latency determiner In other embodiments, as illustrated in FIG. 2B, the actual register 260A is included in the first latency determiner and the actual register 260B is included in the second latency determiner In one example, the actual register 260A and the actual register 260B can be counters.

For a memory access via the port 210, an access request is provided to the port 210. The first latency determiner determines a first latency value indicative of a time difference between origination of the access request ($t_A$) from the port 210 and a response ($t_R$) from the electronic memory, for example the electronic memory 105. The active register 240A holds a number of active access requests that have been started and not yet completed. The active access requests correspond to number of latency cycles that needs to be accounted for active transactions per cycle. In each cycle, the number of active access requests is added to a running sum of differences in order to account for an extra cycle latency for the active access requests. The target register 245A stores a target value that is predetermined for the port 210. The target value is indicative of a desired average latency for access requests from the port 210 and is subtracted once for each access request. For each access request, a difference between the latency value of the access request and the target value in the target register 245A, for the port 210, is determined The difference can be determined either at end of the memory access or during the memory access. The difference is further stored in and added to the running sum of differences for the port 210. The running sum of differences is maintained by the accounting unit 255A for one or more of the access requests from the port 210. The running sum of differences is further used to provide the arbitration unit 255 a delta of a first priority value.

Similarly, for a memory access via the port 215, an access request is provided to the port 215. The second latency determiner determines a second latency value indicative of a time difference between origination of the access request ($t_A$) from the port 215 and a response ($t_R$) from the electronic memory, for example the electronic memory 105. The active register 240B holds a number of active access requests that have been started and not yet completed. In each cycle, the number of active access requests is added to the running sum of differences in order to account for an extra cycle latency for the active access requests. The target register 245B stores a target value that is predetermined for the port 215. The target value is indicative of a desired average latency for the access requests from the port 215. For each access request, a difference between the latency value of the access request and the target value in the target register 245B, for the port 215, is determined. The difference can be determined either at end of the memory access or during the memory access. The difference is further stored in and added to a running sum of differences for the port 215. The running sum of differences is maintained by the accounting unit 255B for one or more of the access requests from the port 215. The running sum of differences is further used to provide the arbitration unit 255 a delta of a second priority value.

In some embodiments, the active register 240A and the active register 240B are not included and functions of the active register 240A and the active register 240B can be performed by the first latency determiner and the second latency determiner respectively.

In other embodiments, as illustrated in FIG. 2B, the actual register 260A and the actual register 260B are part of the first latency determiner and the second latency determiner, respectively. The actual register 260A and the actual register 260B store latency values of the access requests that are in progress via the port 210 and the port 215 respectively. In one example, the selected ports can each have multiple actual registers if multiple access requests can be in progress simultaneously on such port. Further, the delta register 265A and the delta register 265B can store the difference between the latency value of the access request and the target value for the port 210 and the port 215 respectively.

The running sum of differences for a port, for example the port 210 and the port 215, is hereinafter referred to as account value.

In some embodiments, the difference is added to the account value at the end of the memory access. In other embodiments, the difference is added to the account value during the memory access if the latency value is greater than the target value that is (latency value−target value)>0. In some other embodiments, the difference is added unconditionally to the account value during the memory access. For the embodiments in which the account value that accumulates deltas of previous memory accesses is updated at the end of a running memory access, at each time point k, the account value is updated according to equation (1) given below:

$$\text{account value } [k] = \text{account value } [k-1] + \text{latency value } [k] - \text{target value } [k] \quad (1)$$

For the embodiments in which the account value is updated at the end of the running memory access, the time point k corresponds to completion of a $k^{th}$ access request. For the embodiments in which the account value is updated during the running memory access, the account value can further include intermediate results for the access requests that have not yet completed.

If none of the clients has a hard tight deadline, the time point k can be chosen such that the equation (1), which updates the account value, is executed at the end of every memory access. For the client that has the hard tight deadline, the time point k is chosen such that the equation (1) that updates the account value is executed one or more times during the memory access, provided (latency value−target value)>0. Updating the account value prior to completion of the memory access is to increase, as soon as possible, the priority of the client that shows signs of missing deadline.

The account value of the port, for example the port 210 and the port 215, provides information about latency performance of the port. If the account value of the port is at value zero then the port on average is close to achieving the target value. If the account value is a positive value then the port has on average not been achieving the target value. Similarly, if the account value of the port is at a negative value then the port has on average been responding faster than the target value.

In some embodiments, weights can be assigned to the difference of the latency value and the target value prior to accumulation into the account value. A positive difference can be assigned a large weight while a negative difference is assigned a small weight. In one embodiment, the account value decreases upon the negative difference, and never reduces below a certain lower limit, for example zero. As a consequence the priority value is not reduced below a certain lowest value even if the latencies are low, for example lower than the target value. Such an embodiment is to be used for the clients that require not only complete compliance with the deadline, but also minimizing of the latency.

In some embodiments, recent latency performances are considered highly important as compared to latency performances of the past. Hence, recent latencies can be efficiently weighed, for example by using an infinite impulse response (IIR) accumulation in equation (2) given below:

$$\text{account value } [k] = \alpha \cdot \text{account value } [k-1] + \text{latency value } [k] - \text{target value } [k] \quad (2)$$

where $\alpha$ is a factor that is slightly less than unity, for example 0.99 or 0.999, and which serves to de-emphasize past latencies with reference to the recent latencies. Such a technique can be applied to the clients that require de-emphasis of past latency performances relative to recent latency performance.

In other embodiments, multiple account values per port can be maintained to deemphasize latency performances of the past. Each account value can serve for a certain time period or number of memory accesses. When the account value reaches a maximum age, the account value is retired and a new account value is started. When the account value reaches the maximum age, the account value can also be assigned lesser weight than weight of the new account value. For a client that needs de-emphasis of the past latency performance relative to the recent latency performance, a beneficial mode of operation is to maintain multiple account values per port and retire an account value when a pre-determined age is reached.

The account value of the port 210 and the port 215 can be capped at both positive and negative ends. The account value of the port 210 or the port 215 can have a maximum value (MAX_ACCOUNT) and a minimum value (MIN_ACCOUNT) of corresponding port. The MAX_ACCOUNT and the MIN_ACCOUNT can have similar values or different values for the port 210 and the port 215.

The arbitration unit 255 receives the account values of each of the ports for which latency is to be guaranteed, for example the port 210 and the port 215, and associates priority values with each such port. Based on relative values of priorities associated with each port, the arbitration unit 255 can control access by allowing at a time one, or at most few of the ports access to the electronic memory 105. In controlling the access to the electronic memory 105, the arbitration unit 255 determines the order in which access is granted to the ports with associated priorities. The arbitration unit 255 also ensures that the port with associated priority, for example the port 210 and the port 215, meet the target values within a specified time period by monitoring respective latency performances and assigning a higher priority value to the port of which access requests have recently not met the target value.

In one example, the arbitration unit 255 assigns a positive or relatively higher priority value to the ports with a positive account value. A higher priority value is assigned to one of the ports thereby overtaking the port having a next higher priority. Similarly, the arbitration unit 255 assigns a negative or relatively lower priority value to the ports with a negative account value. A lower priority value is assigned to one of the ports thereby shifting the port below the port having a next lower priority. The delta of the priority value is positive at a value +1 and +2, and negative at a value −1. The order in which the arbitration unit 255 serves the ports is determined based on such priority values. A higher priority value also signifies that the port experiences lower latency. The higher priority value can also yield lower latencies for next access requests. The delta of the priority value varies monotonically with the account value. In general, an association or mapping between the account value and priority does not in general have restrictions as long as the mapping is monotonic, that is, if the account value increases then the priority must not decrease, and if the account value decreases, then the priority must not increase. An initial priority value of the port is an initial value that is adjusted, by a delta, based on the account value. The priority of the port is hence equivalent to the sum of the initial priority value and the delta of the priority value. The delta of the priority value for the port is determined if bandwidth usage of the port is within a bandwidth limit for the port.

In some embodiments, the mapping between the account value and the delta of the priority value of the port can be expressed as per the following equations:

$$-2t \leq \text{account value} < -t : \text{delta of the priority value} = -1 \quad (3)$$

$$-t \leq \text{account value} < 0 : \text{delta of the priority value} = 0 \quad (4)$$

$$0 \leq \text{account value} < t : \text{delta of the priority value} = 1 \quad (5)$$

$$t \leq \text{account value} < 2t : \text{delta of the priority value} = 2 \quad (6)$$

where a higher priority value indicates precedence in service by the arbitration unit 255, and t refers to a threshold value. The threshold value (t) also equals an interval between the MIN_ACCOUNT and the MAX_ACCOUNT divided by number of priority levels.

The port with the positive account value has an increase in the priority. Such an increase can cause the latency value to be less than the target value for next several memory accesses. Consequently, the account value can decrease, which in turn triggers a downward adjustment in the priority. Hence, the priorities are dynamically adjusted such that the ports are able to meet or converge towards respective target latencies.

The account value can be generalized to mapping of the priority value in order to have greater or lesser number of the priority levels, thereby obtaining desired resolution in the priority value. The priority values can also occupy unequal divisions of the interval between the MIN_ACCOUNT and the MAX_ACCOUNT.

The mapping between the account value and the priority value can be changed in order to adjust speed with which the latency values converge to the target values. For ports having clients with hard tight deadlines, even a slight increase in the account value beyond value zero triggers a high priority value. For such ports the latency value instantly decreases and converges to the target value. Similarly, for ports having clients with long deadlines, a sizeable increase is allowed in the account value before increasing the priority value. That is, by controlling speed of convergence, the clients with the hard tight deadlines are allowed to meet deadlines by temporarily allowing the clients with longer deadlines to lag with respect to the target values. For the ports having clients with the tight deadlines, the MAX_ACCOUNT is set to a low value and for the ports having clients with the longer deadlines, the MAX_ACCOUNT is set to a high value.

The account value can be translated to the priority value after the access request is satisfied, in accordance with one embodiment. In another embodiment, the priority value can be adjusted prior to the access request being satisfied. Such an embodiment can be used for the clients with hard tight deadlines in order to prevent high latencies by increasing the priority value even before the access request is satisfied.

In some embodiments, for the clients having both the hard deadlines and the tight deadlines, initial priority value can be set to higher than a nominal value. The priority value is allowed to increase based upon the account value and is maintained such that the priority value does not decrease below the initial priority value.

It can be ensured that on an average, the ports under control of the arbitration unit 255 meet respective target values in a guaranteed manner. The term guarantee can be defined such that for a set of N consecutive access requests an average of latency values of the access requests does not exceed the target value by more than a maximum offset value divided by N. Hence, if N has a higher value, the average of latency values is guaranteed to be below the target value or exceed the target value by at most a lower number. The maximum offset value depends on the worst-case latencies that the access request can experience for different priority values. The maximum offset value divided by N further depends on the mapping of the account value to the delta of the priority value. For the mapping given above, the priority is raised when the account value $>=0$. For the guarantee, the target values for each port under control of the arbitration unit 255 is to be selected appropriately. For example, if the target values are set at a low value, for example 0.000 atto-seconds, then no port can satisfy the guarantee.

In order to set appropriate target values for the port, a worst-case latency (WC) for an individual access request is determined The worst-case latency can be defined as latency when the memory access request is served with the highest priority. In general, the worst-case latency depends on multiple factors, for example (1) semiconductor technologies, for example complementary metal oxide semiconductors, and bipolar junction transistors, (2) size of the transistors comprising the electronic memory 105, for example 120 nanometers or 65 nanometers, (3) type of the electronic memory, for example dynamic random access memory referred by one or more industry standards, for example DDR3 1600, or DDR2-400C, (4) architecture of the memory controller 110, for example queue sizes, reordering capabilities, and scheduling algorithm, and (5) address of the access request. The target value for a single port requiring the latency guarantee needs to be set higher than the worst-case latency for individual access request. The port with the highest priority value is then guaranteed to meet the respective target value for the access request.

If the target value is to be met for more than one port in a guaranteed manner, then the target values for each such port must be set further higher than setting of the target value that is used for guaranteeing latency on the single port. The target values for latency guarantees on multiple ports depend on rate of the access requests for both the port under consideration as well as the other ports that need to meet latency on a guaranteed basis. The latency is guaranteed on multiple ports if the target value on the port with guaranteed latency is set higher than a sum over the ports of the worst-case latencies for individual access requests.

Hence, if $WC_i$ is the worst-case latency for the individual access request on the $i^{th}$ port, then the target value on the port for which the latency guarantee is required must be set higher than $\Sigma_i WC_i$, which is a sum of the worst-case latency for the ports that require a latency guarantee.

If the target values are not set as described above, the present disclosure even then operates, such that the latency value on each port would still converge towards the target value, although the target value might not be reached in a sufficiently short length of time.

Figure 3:
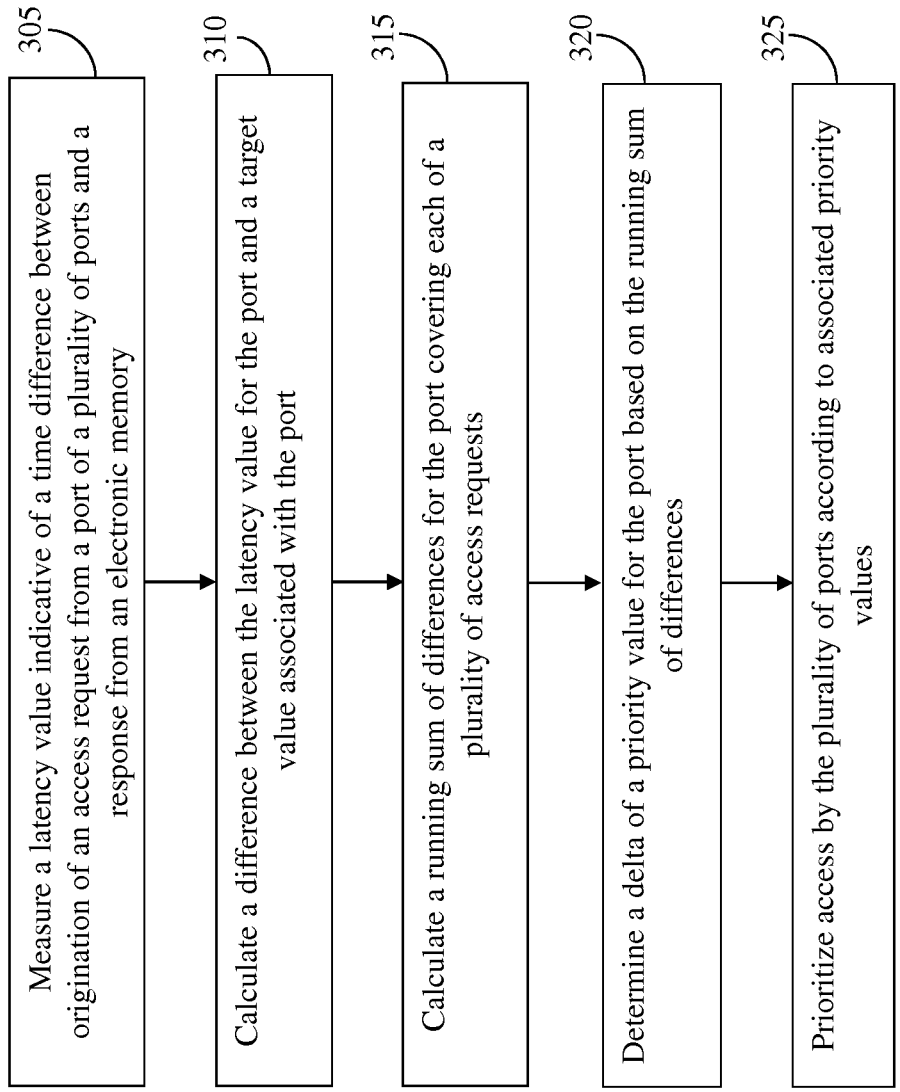
FIG. 3 is a flow diagram illustrating a method of controlling an electronic memory by a memory arbiter, in accordance with one embodiment.

FIG. 3 is a flow diagram illustrating a method of controlling an electronic memory, for example the electronic memory 105, by a memory arbiter, for example the memory arbiter 130, in accordance with one embodiment. The memory arbiter is included in the memory controller, for example the memory controller 110. The memory controller further includes a plurality of ports.

At step 305, a latency value indicative of a time difference is measured between origination of an access request from a port and a response from the electronic memory. The latency value can be measured by a latency determiner associated with the port. The latency value can further be stored in the latency determiner In some embodiments, the latency value can be stored in an actual register that is coupled to the port.

At step 310, a difference between the latency value for the port and a target value associated with the port is calculated. The target value is predetermined and is indicative of a desired average latency for access requests from the port. The target value is further stored in a target register. The difference between the latency value and the target value is calculated and subsequently be stored in an accounting unit. In some embodiments, the difference is stored in a delta register that is associated with the port.

At step 315, a running sum of differences for the port covering each of the access requests is calculated. The difference is added to the running sum of differences also referred to as an account value. The running sum of differences is also weighed according to associated recency of occurrence. The running sum of differences is stored in the accounting unit associated with the port and further provided to the memory arbiter.

At step 320, a delta of a priority value for the port is determined based on the running sum of differences. The running sum of differences or the account value can be translated to the delta of the priority value by the memory arbiter after the access request is satisfied or prior to the access request being satisfied. The delta of the priority value varies monotonically with the account value. The delta of the priority value can be of a higher priority value or a lower priority value based on a positive account value or a negative account value respectively. Based on the delta of the priority value, the memory arbiter can control memory accesses by allowing the port to access the electronic memory.

The delta of the priority value is equal to zero if the running sum of differences for the port is negative and an absolute value of the running sum of differences is one of lesser than and equal to a positive threshold value. The delta of the priority value is set as negative if the running sum of differences for the port is negative and the absolute value of the running sum of differences is higher than the positive threshold value. The delta of the priority value is set as positive if the running sum of differences for the port is positive and one of equal to and higher than zero.

At step 325, the access by the ports is prioritized according to associated priority values. The memory arbiter ensures that the ports meet respective target values within a specified time period by monitoring respective latency performances and assigning a higher priority value to the port whose access requests have recently not met the target value. The order in which the memory arbiter serves the ports is determined based on the associated priority values. The port with the positive account value has a higher priority value which can cause the latency value to be less than the target value for next several memory accesses. Consequently, the account value for the port can decrease, which in turn triggers a downward adjustment in priority value. Hence, priority values of the ports are dynamically adjusted by the memory arbiter such that the ports are able to converge towards the respective target values.

In some embodiments, one or more steps can be implemented using an electronic device. The electronic device can include the memory controller 110 and the electronic memory 105. The electronic device includes a processor coupled with a bus for processing information. The electronic memory 105, for example a random access memory (RAM) or other dynamic storage device, can be coupled to the bus for storing information required by the processor. The electronic memory 105 can be used for storing temporary variables or other intermediate information required by the processor. The electronic device can also include a read only memory (ROM) or other static storage device coupled to the bus for storing static information for the processor. A storage device, for example a magnetic disk or optical disk, can also be provided and coupled to the bus for storing information. The electronic device can be coupled via the bus to a display for example a cathode ray tube (CRT), a liquid crystal display (LCD) or a light emitting diode (LED) display, and an input device for communicating information and command selections to the processor.

In one embodiment, the techniques are performed by the processor using information included in the electronic memory 105. The information can be read into the electronic memory 105 from another computer-readable medium, for example the storage unit.

The term "computer-readable medium" as used herein refers to any medium that participates in providing data that causes a computer to operate in a specific fashion. In an embodiment implemented using the electronic device, various computer-readable media are involved, for example, in providing information to the processor. The computer-readable medium can be a storage media. Storage media includes both non-volatile media and volatile media. Non-volatile media includes, for example, optical or magnetic disks, for example the storage unit. Volatile media includes dynamic memory, for example the memory. All such media must be tangible to enable the information carried by the media to be detected by a physical mechanism that reads the information into a computer.

Common forms of computer-readable medium include, for example a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge.

In another embodiment, the computer-readable medium can be a transmission media including coaxial cables, copper wire and fiber optics, including the wires that include the bus. Transmission media can also take the form of acoustic or light waves, for example those generated during radio-wave and infra-red data communications.

The electronic device also includes a communication interface coupled to the bus. The communication interface provides a two-way data communication coupling to a network. For example, the communication interface can be a wireless port, Bluetooth port, IrDa port, and wired port. In any such implementation, communication interface sends and receives electrical, electromagnetic or optical signals that carry digital data streams representing various types of information.

In the foregoing discussion, the term "coupled" refers to either a direct electrical connection between the devices connected or an indirect connection through intermediary devices.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description.

What is claimed is:

1. A memory controller comprising:
a plurality of ports in communication with an electronic memory;
a memory arbiter in communication with the electronic memory and operative to determine priorities among a plurality of access requests from the plurality of ports;
a plurality of latency determiners in communication with the plurality of ports, a latency determiner of the plurality of latency determiners in communication with a port of the plurality of ports and operative to determine a latency value indicative of a time difference between origination of an access request from the port and a response from the electronic memory, the latency value corresponding to the access request;
a plurality of target registers associated with the plurality of ports, a target register of the plurality of target registers associated with the port to store a target value for the port, the target value indicative of a desired average latency for the plurality of access requests from the port; and
a plurality of accounting units associated with the plurality of ports, an accounting unit of the plurality of accounting units associated with the port that maintains a running sum of differences between a plurality of latency values of the access requests and the target latency value for one or more of the plurality of access requests from the port to provide the memory arbiter a delta of a priority value.

2. The memory controller as claimed in claim 1, wherein the memory arbiter assigns priorities to the plurality of access requests from the plurality of ports according to priority values of the plurality of ports.

3. The memory controller as claimed in claim 1, wherein the latency value is stored by one of an actual register and the latency determiner.

4. The memory controller as claimed in claim 3, wherein the actual register for the port is one of a plurality of registers performing identical functions.

5. The memory controller as claimed in claim 1 and further comprising
a delta register that stores a difference between the latency value and the target value for the port.

6. The memory controller as claimed in claim 1, wherein the delta of the priority value varies monotonically with the running sum of differences.

7. The memory controller as claimed in claim 1, wherein the delta of the priority value for the port is positive if the running sum of differences for the port is positive, and negative if the running sum of differences for the port is negative.

8. The memory controller as claimed in claim 1, wherein the delta of the priority value for the port is zero if the running sum of differences for the port is negative and an absolute value of the running sum of differences is one of lesser than and equal to a positive threshold value,
negative if the running sum of differences for the port is negative and the absolute value of the running sum of differences is higher than the positive threshold value,
positive if the running sum of differences for the port is positive and one of equal to and higher than zero.

9. The memory controller as claimed in claim 8, wherein the delta of the priority value is positive at one of a value +1 and a value +2.

10. The memory controller as claimed in claim 8, wherein the delta of the priority value is negative at a value −1.

11. The memory controller as claimed in claim 1, wherein the plurality of latency determiners performs identical functions.

12. The memory controller as claimed in claim 11, wherein the latency determiner comprises a counter.

13. The memory controller as claimed in claim 1, wherein the plurality of target registers performs identical functions.

14. The memory controller as claimed in claim 1, wherein the plurality of accounting units performs identical functions.

15. The memory controller as claimed in claim 14, wherein the accounting unit comprises an arithmetic and logic unit.

16. A method of controlling access to an electronic memory, the method comprising:
measuring a latency value indicative of a time difference between origination of an access request from a port of a plurality of ports and a response from the electronic memory;
calculating a difference between the latency value for the port and a target value associated with the port;
calculating a running sum of differences for the port covering each of a plurality of access requests;
determining a delta of a priority value for the port based on the running sum of differences; and
prioritizing the access by the plurality of ports according to associated priority values.

17. The method as claimed in claim 16, wherein determining the delta of the priority value for the port comprises
setting the delta of the priority value equal to zero if the running sum of differences for the port is negative and an absolute value of the running sum of differences is one of lesser than and equal to a positive threshold value.

18. The method as claimed in claim 16, wherein determining the delta of the priority value for the port comprises
setting the delta of the priority value as negative if the running sum of differences for the port is negative and an absolute value of the running sum of differences is higher than a positive threshold value.

19. The method as claimed in claim 18, wherein setting the delta of the priority value as negative comprises
assigning a lower priority value to the port as compared to the priority value of the port having a next lower priority.

20. The method as claimed in claim 16, wherein determining the delta of the priority value for the port comprises
setting the delta of the priority value as positive if the running sum of differences for the port is positive and one of equal to and higher than zero.

21. The method as claimed in claim 20, wherein setting the delta of the priority value as positive comprises
assigning a higher priority value to the port as compared to the priority value of the port having a next higher priority.

22. The method as claimed in claim 16, wherein calculating the running sum of differences for the port comprises weighing the running sum of differences according to associated recency of occurrence.

23. The method as claimed in claim 16, wherein determining the delta of the priority value for the port is based on determining if bandwidth usage of the port is within a bandwidth limit for the port.

24. A computer program product stored on a non-transitory computer-readable medium that when executed by a processor, performs a method of controlling access to an electronic memory, comprising:
   measuring a latency value indicative of a time difference between origination of an access request from a port of a plurality of ports and a response from the electronic memory;
   calculating a difference between the latency value for the port and a target value associated with the port;
   calculating a running sum of differences for the port covering each of a plurality of access requests;
   determining a delta of a priority value for the port based on the running sum of differences; and
   prioritizing the access by the plurality of ports according to associated priority values.

25. The computer program product as claimed in claim 24, wherein determining the delta of the priority value for the port comprises
   setting the delta of the priority value equal to zero if the running sum of differences for the port is negative and an absolute value of the running sum of differences is one of lesser than and equal to a positive threshold value.

26. The computer program product as claimed in claim 24, wherein determining the delta of the priority value for the port comprises
   setting the delta of the priority value as negative if the running sum of differences for the port is negative and an absolute value of the running sum of differences is higher than a positive threshold value.

27. The computer program product as claimed in claim 24, wherein determining the delta of the priority value for the port comprises
   setting the delta of the priority value as positive if the running sum of differences for the port is positive and one of equal to and higher than zero.

28. The computer program product as claimed in claim 27, wherein setting the delta of the priority value as positive comprises
   assigning a higher priority value to the port as compared to the priority value of the port having a next higher priority.

29. The computer program product as claimed in claim 24, wherein setting the delta of the priority value as negative comprises
   assigning a lower priority value to the port as compared to the priority value of the port having a next lower priority.

30. The computer program product as claimed in claim 24, wherein calculating the running sum of differences for the port comprises
   weighing the running sum of differences according to associated recency of occurrence.

31. The computer program product as claimed in claim 24, wherein determining the delta of the priority value for the port is based on determining if bandwidth usage of the port is within a bandwidth limit for the port.

* * * * *